US006366419B1

(12) United States Patent
Gaub et al.

(10) Patent No.: US 6,366,419 B1
(45) Date of Patent: Apr. 2, 2002

(54) METHOD OF HEAD DISC ASSEMBLY SERIAL NUMBER ENCODING AND RETRIEVAL AND DISC DRIVE APPARATUS HAVING AN ENCODED HEAD DISC ASSEMBLY SERIAL NUMBER

(75) Inventors: Stephen Matthew Gaub, Platteville; Shochet Mischo; Tracy Allen Sowder, both of Longmont, all of CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/374,451

(22) Filed: Aug. 14, 1999

Related U.S. Application Data

(60) Provisional application No. 60/137,750, filed on Jun. 4, 1999.

(51) Int. Cl.[7] .............................. G11B 5/09; G11B 5/596
(52) U.S. Cl. ...................... 360/48; 360/49; 360/77.08
(58) Field of Search ........................ 360/48, 49, 77.08

(56) References Cited

U.S. PATENT DOCUMENTS 6,141,730 A * 10/2000 Nishiumi et al. ........... 711/115
6,163,814 A * 12/2000 Hill ........................ 360/77.08

* cited by examiner

Primary Examiner—Regina Y. Neal
(74) Attorney, Agent, or Firm—John R. Wahl; Merchant & Gould P.C.

(57) ABSTRACT

Head disc assembly serial number information is encoded in the servo bursts recorded during servo track writing. Specifically, the HDA serial number information is written to the disc during disk manufacture as part of the Servo Track Writing process in between the normal servo frames. The serial number is preferably written on preexisting unique system (non-user) tracks in-between normal servo frames. The encoded serial number can be retrieved by increasing the sampling interval of the servo information, i.e., by over-sampling the servo information. More specifically, by writing the serial number in a servo burst exactly in the middle of two normal servo frames, the information can be retrieved by 2x over-sampling routines called by system diagnostic routines or disc drive certification routines. In addition, a disc drive apparatus having a retrievable encoded head disc assembly serial number is provided.

20 Claims, 9 Drawing Sheets

METHOD OF HEAD DISC ASSEMBLY SERIAL NUMBER ENCODING AND RETRIEVAL AND DISC DRIVE APPARATUS HAVING AN ENCODED HEAD DISC ASSEMBLY SERIAL NUMBER

RELATED APPLICATIONS

This application claims the benefit of priority of United States Provisional Patent Application Ser. No. 60/137,750, entitled "HEAD DISC ASSEMBLY SERIAL NUMBER TAMPING ALGORITHM", filed Jun. 4, 1999.

FIELD OF THE INVENTION

This application relates to magnetic disc drives and more particularly to a method of encoding and decoding head disc assembly serial numbers in servo bursts.

BACKGROUND OF THE INVENTION

Disc drives are data storage devices that store digital data in magnetic form on concentric tracks on a rotating storage medium on a hard disc. A read/write transducer, e.g. a magnetoresistive read/write head, is typically used to transfer data between a desired track and an external environment. The head is typically mounted on a gimbal assembly at the end of an elongated actuator arm which pivots about an axis parallel but spaced from the spin axis of the hard discs. The actuator thus allows the head to move back and forth in an arcuate fashion between an inner radius and an outer radius of the discs. The actuator arm is driven by a control signal fed to a voice coil motor (VCM) mounted at the rear end of the actuator arm. During a write operation, data is written onto a track and during a read operation the head senses the data previously written on the disc track and transfers the information to the external environment. Critical to both of these operations is the accurate locating of the head over the center of the desired track.

A servo system is used to control the movement of the head above the disc using servo signals read from a disc surface in the disc drive. The servo signals generally indicate the present position of the head with respect to the disc, i.e., the current track position. The servo system uses the sensed information to determine how to optimally move the head to a position centered above the desired track. The servo system then delivers a control signal to the VCM to rotate the actuator to position the head over the desired track.

Servo information is typically stored in a disc drive apparatus in one of two ways: sectored servo and dedicated servo. In a sectored servo system, servo information is interspersed with user data on the disc surface. The servo information is stored in arcuate sectors of radial segments or wedges on each track of the disc surface. These segments are interspersed around the track between stored user data on the track. As the disc rotates beneath the head, the head periodically samples the servo sectors to obtain the servo information for the servo system. In a dedicated servo system, the servo information is stored on a separate dedicated disc surface that contains no user data. In this system, servo information is constantly available to the servo control system. In both systems, servo information, in the form of servo bursts which are stored on the discs following drive assembly and prior to drive use to store and retrieve data, is written during a servo track writing process. The servo track writing process, is used to tell the system whether the heads are correctly located over the desired track. Each servo burst typically contains the following sections: an automatic gain control (AGC) segment, a GAP segment, a prefix segment, a gray code segment, and four track following bursts A, B, C, and D.

The current manufacturing process, and some drive customers, require the serial number of the head disc assembly (HDA) to be electronically stored and retrievable on demand. Typically, a bar code label is attached to the outer surface of the HDA that uniquely identifies the drive with a serial number. This label may be optically read during the servo track writing (STW) process and written in the data field of the servo burst. However, this approach is expensive and takes additional time during the servo track writing process. An EEPROM or other non-volatile memory can be used to store the serial number, once read or manually entered. However, this approach requires additional non-volatile memory. The information could be interleaved into the normal gray code and servo frame space, but since modulo gray code needs all servo bursts in order to track follow, it is not feasible.

SUMMARY OF THE INVENTION

Against this backdrop the present invention has been developed. The present invention is a method of encoding and also retrieving information, and in particular, head disc assembly serial number information in the servo information recorded as part of the servo track information. Specifically, the HDA serial number information is written to the disc as part of the STW process in between the normal servo frames. The serial number is preferably written on preexisting unique system (non-user) tracks in-between normal servo frames or wedges. By increasing the sampling interval of the servo information, i.e., by over-sampling the servo information, these unique (non-user) tracks may be read, and the information such as the HDA serial number may then be retrieved. More specifically, by writing the serial number exactly in the middle of two normal servo frames, the information can be retrieved by 2×over-sampling.

The serial number, up to 16 characters long, typically made of American Standard Code for Information Interchange (ASCII) characters, is stored in an encoded fashion on the disc. Typically the first and last 8 tracks on the disc are not generally used for user data as they are very close to the inner and outer diameter guard bands. Therefore these bands or tracks are designated the "over-sample" tracks, and the gray coded HDA serial number information is written in gray code in servo bursts located exactly between the normal burst sectors. The encoding is done in the following manner. First, each 8 bit ASCII HDA serial number character is converted to 9 bits with even parity appended. Second, the 9 bit parity appended ASCII character is encoded in the appropriate gray code. By using the 9 bits of ASCII as an index into the encode table of run length limited gray codes stored in a ROM table, the gray code information is radially coherent across multiple tracks on the disc. Third, the encoded serial number is written, one gray encoded character at a time, per over-sample frame on the disc, starting at physical index (servo sector 0). Fourth, the writing process is repeated around the disc such that multiple copies of the serial number are written on each of the over-sample tracks. For example, if there are 16 characters in the serial number, with the last character being a termination character gray encoded zero, and there are 96 normal servo frames or wedges on the disc, then there will be 6 complete copies of the HDA serial number on each over-sample track on the disc and thus 6 copies of each character on each track.

The decode process is the opposite of the encode process, with the decode taking place during track following operation while the drive is following, over the specified "over-sample" track location. For example, first, a user request is lodged to retrieve the HDA serial number. This request is typically made in software, namely certification routines and diagnostic routines. The actuator head is positioned on one of the non-user over-sample tracks and the servo bursts are 2x over-sampled. Second, each gray code retrieved from an over-sampled burst is decoded, i.e. converted to a 9 bit ASCII character. Third, each decoded 9 bit character is converted back to an 8 bit ASCII serial number character and stored for subsequent display or use. This process is repeated for each over-sample burst around the disc until a termination character is sensed, signifying the end of the HDA serial number. Over-sampling is then ceased and control is returned to normal burst processing. If errors are encountered during the read operation on the over-sample track, the following events may occur: All copies of the serial numbers on a given track are tried. If the error persists, the head is switched to another track and the decode is tried again to decode another copy of the serial number. This process is repeated until the entire serial number is successfully retrieved. With multiple copies of the serial number encoded on these tracks, the likelihood of successful retrieval is maximized. The number thus retrieved may be subsequently stored on the data portion of the disc and retrieved in a conventional manner, or may be reread each time a diagnostic or certification routine makes the request.

These and various other features as well as advantages which characterize the present invention will be apparent from a reading of the following detailed description and a review of the associated drawings.

BRIEF DESCRIPTION OF THE DRAWINGS

FIG. 4-1 and 4-2 is a flow chart of the Address Mark Interrupt Service firmware routine in accordance with a preferred embodiment of the present invention.

DETAILED DESCRIPTION

Figure 1:
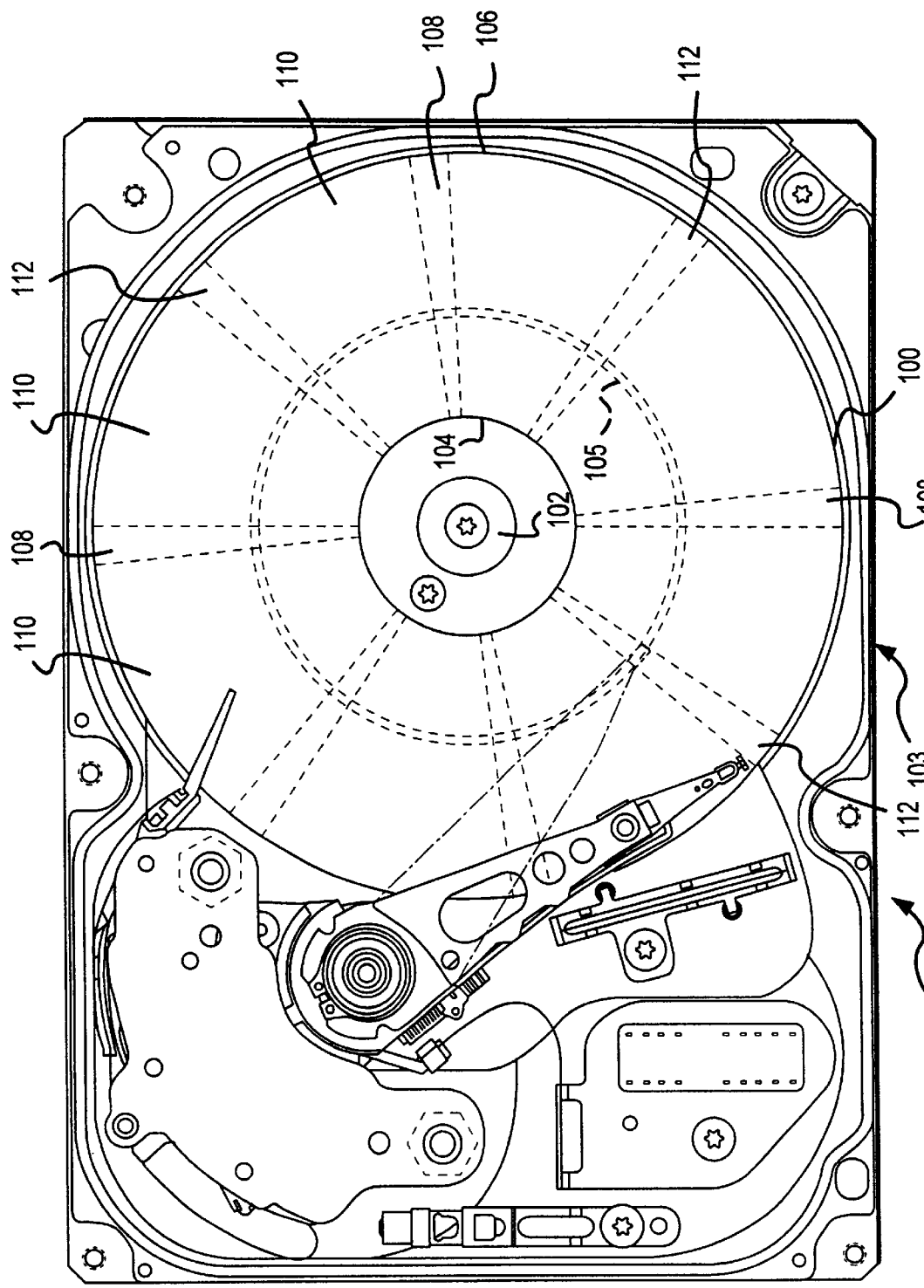
FIG. 1 is a plan view of a hard disc drive with the head disc assembly cover removed illustrating a track and the location of normal servo sector wedges and over-sample servo wedges on the hard disc indicated in dashed lines in accordance with a preferred embodiment of the invention.

A schematic plan view of a typical hard disc 100 is shown in a hard disc drive 101 in FIG. 1. The hard disc 100 is mounted on a spindle motor 102 in a head disk assembly (HDA) 103, as is well known, for rotation at a constant speed. The surface of the disk 100 has a magnetically permeable media thereon typically for storage of both servo data and user data. This data is typically arranged in concentric tracks between an inner diameter 104 and an outer diameter 106. The servo data is typically written in servo sectors or wedges 108, shown exaggerated in size, in FIG. 1 for illustration purposes only, spaced equally around the disc 100 from the ID to the OD defining data sectors 110 therebetween. Equally spaced in between the servo sectors 108 are over-sample servo wedges 112 which contain the HDA serial number digits encoded in gray code in accordance with the present invention.

The HDA serial number encoding and retrieval method in accordance with the present invention incorporates several software and firmware routines, and is preferably accessed during initial calibration and certification of the drive and during diagnostic routines. The presently preferred embodiment of the method is embodied in the following routines: an Address Mark Detect Interrupt hardware routine, Address Mark time out interrupt hardware routine, Servo Burst Interrupt Service hardware routine, and a Serial Number Retrieval software routine. The Burst Interrupt Service routine is a substantially conventional normal burst interrupt code with the exception of the portions shown in FIG. 3 and described herein. The SN Retrieval software routine calls the following subroutines to switch between normal servo sampling and over-sampling modes: an Over-sample Switch routine and a Normal Sample Recovery routine.

The gray code encoded digits of the HDA serial number, up to 16 digits in length, are written, during manufacture in the initial Servo Track Writing operation, in servo sectors intermediate to the normal servo sectors on the disc surface in preparation for retrieval as described below. Preferably these "over sample" servo sectors are positioned half way between the normal servo sectors, and coded digits can be retrieved by over-sampling the servo sectors at twice the normal rate. During normal sampling, only the normal servo sectors are read. During over-sampling, both normal servo sectors and over-sample sectors are read. Each over-sample servo sector has encoded in it one digit of the HDA serial number. The encoded serial number is repeated over and over sequentially around the disc.

Between each serial number is encoded a termination digit, typically a "0", although any other symbol may be used.

It should be noted here that the over-sampling could be done at a different rate corresponding to a different positioning of the over-sample servo sectors. For example, if two over-sample servo sectors are equally spaced between each of the normal sectors, an over-sample rate of three times the normal rate, rather than 2x, could be used to achieve the same results as described herein. In this way, twice the number or size of serial number could be stored and retrieved from the over-sample sectors compared to the preferred embodiment specifically described herein. Accordingly, the methodology described herein is merely exemplary of one embodiment.

Figure 2:
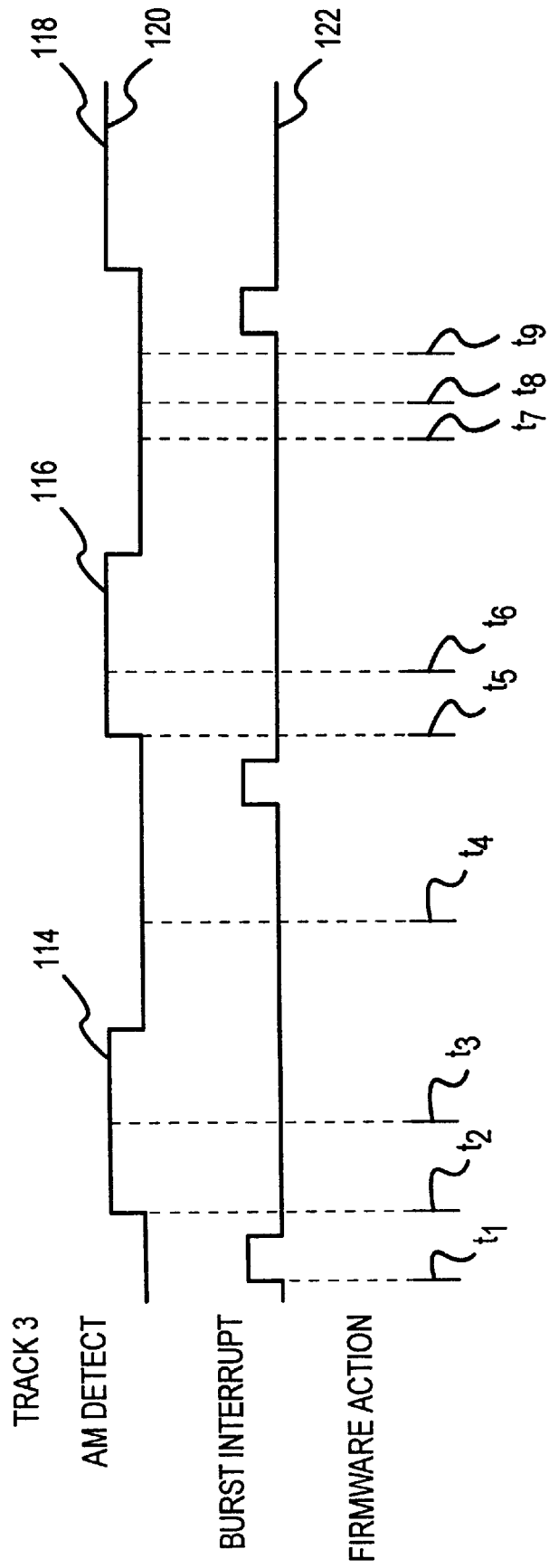
FIG. 2 is a timing diagram of the HDA serial number retrieval method implemented on an exemplary track 3 in accordance with a preferred embodiment of the present invention.

FIG. 2 is a schematic representation of the timing of servo burst detection to retrieve the HDA serial number digits from the over-sample sectors 112 in accordance with the invention, when track following on exemplary Track 3. The first line 120 in FIG. 2 represents the Address Mark (AM) timing signal which changes from a first state to a second state as each servo sector passes sequentially beneath the read/write head. Specifically shown in FIG. 2 are exemplary servo sector 0 (114), over sample sector 0'(116), and servo sector 1 (118). It is to be understood that the signals shown, e.g., the AM detect signal 120, repeats in the illustrated fashion for each sector around the track on the disc 100. Over sample sector 0' (118) has been written on disc 100 exactly in between sector 0 (114) and sector 1 (118). A burst interrupt timing signal 122 is shown on the second line in FIG. 2.

Figure 3:
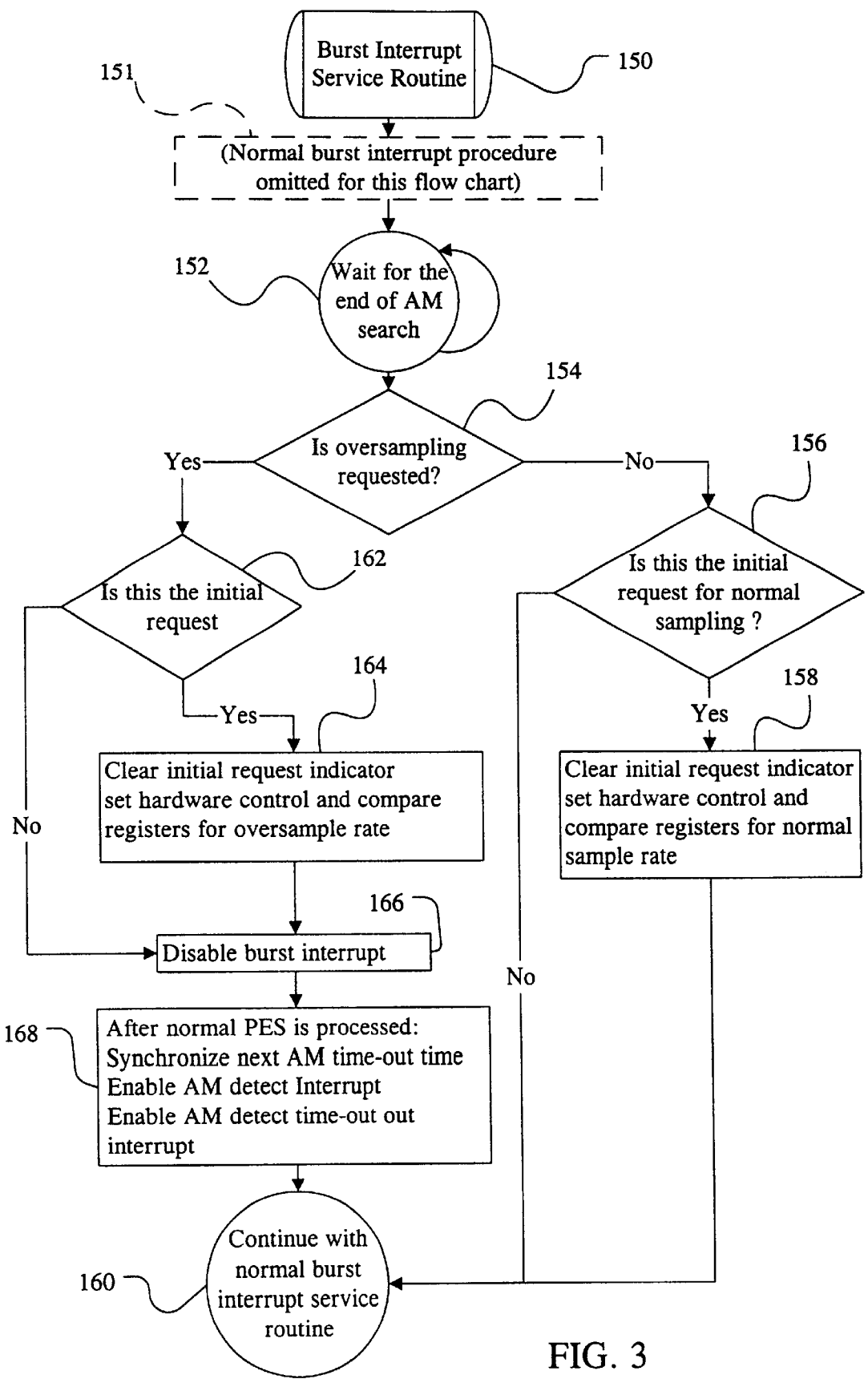
FIG. 3 is a flow chart of the Burst Interrupt Service firmware routine in accordance with a preferred embodiment of the present invention.

At time t1 a hardware generated burst interrupt occurs. The burst interrupt is a hardware generated interrupt used to process the normal sample rate servo burst information and is also used by calibration and HDA certification software to invoke the HDA serial number retrieval system, i.e., to synchronize the hardware switch to and from over-sample modes. The burst interrupt at t1 invokes the burst interrupt service routine 150 shown in FIG. 3 to process normal sample rate servo burst information. The operations shown in FIG. 3 are implemented prior to most of the normal burst interrupt processing, which is conventional. Therefore the normal burst interrupt procedure, indicated by reference numeral 151, is omitted from the flow chart shown in FIG. 3.

When the burst interrupt is received in initial routine operation 150, control then transfers to wait operation 152 in which the routine waits until the Address Mark (AM) search routine (not shown) is complete. The Address Mark search routine identifies the presence of an Address Mark in a servo burst. This routine is conventional and therefore is not shown.

When the AM search routine is complete, control transfers from wait operation 152 to query 154 that asks whether over sampling to determine the HDA serial number has been requested by a certification program or diagnostic. If the answer is no, control transfers to query 156 which asks whether this is the initial request for normal sampling? If the answer is yes, then control transfers to operation 158. Operation 158 clears or resets the initial request flag. This operation also sets the hardware control and compare registers for normal sample rate operation. Control then transfers to operation 160 which continues the conventional normal burst interrupt service routine.

However, if in query 154 the answer is yes, over-sampling has been requested, control transfers to query 162, which asks whether this is the initial request for over sampling. If this is the first request, then control transfers to operation 164 where the initial request indicator flag is cleared or reset and the hardware and compare registers are set for the over-sample rate. Control then transfers to operation 166 which disables the burst interrupt. Control then transfers to operation 168 in which the normal position error signal (PES) is processed. This includes synchronizing the next AM time-out time period, enabling AM detect interrupt, and enabling AM detect time-out out interrupt. Control then transfers to operation 160 where normal burst interrupt service routine resumes. If, however, in query 162, the answer is no, it is not an initial request for over-sampling, then control transfers directly to operation 166 where the burst interrupt is disabled without passing through operation 164. The remainder of the burst interrupt service routine is conventional and therefore is not set forth in this specification.

Figures 1, 4:
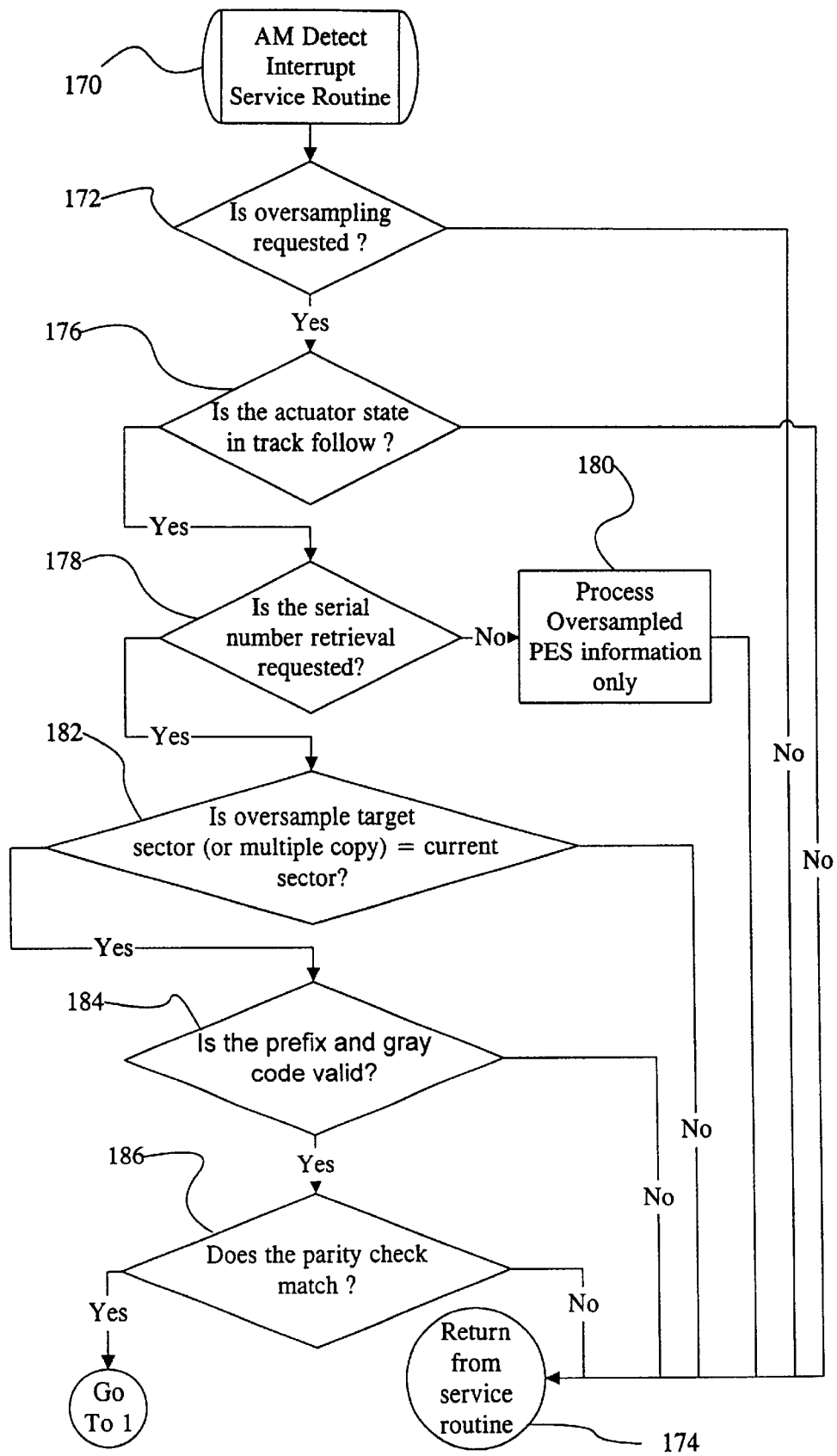
Figures 2, 4:
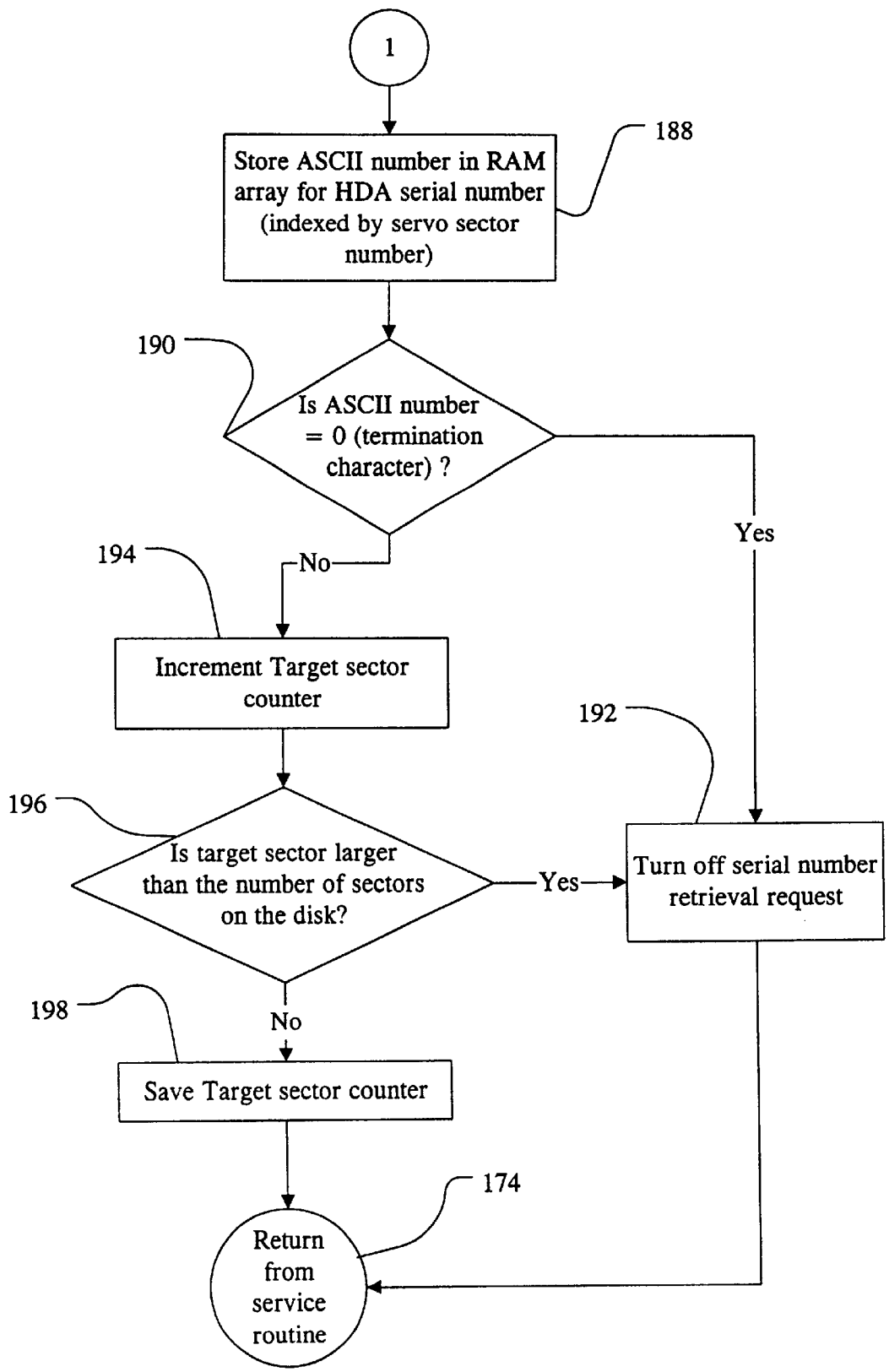

The AM interrupt is a hardware interrupt that is generated when the servo sequencer detects the unique pattern of the servo address mark provided by the read channel. It is also used to process the over-sampled servo burst information. This processing includes the conversion of gray code to HDA serial number digit. The AM detect interrupt service routine 170 is shown in FIG. 4 and begins in operation 170. Control then transfers to query operation 172 which asks whether over-sampling has been requested. If not, control returns back to normal service in operation 174. If the answer in query 172 is yes, control transfers to query operation 176 which asks whether the actuator control is in the track following state, i.e., the actuator carrying the read/write head or heads is on the specified track in track following mode or state and thus on track within acceptable tolerances. If the answer to query 176 is no, then control returns via operation 174, since the HDA serial number retrieval may only be done in track following mode. IF the answer to query 176 is yes, control then transfers to query operation 178 which asks whether retrieval of the HDA serial number has been requested. If no, control transfers to operation 180 where the position error signal (PES) information only in the over-sample burst is processed. Control then returns via operation 174. If the answer to query 178 is yes, then control transfers to query operation 182 which asks whether the over-sample target sector is equal to the current sector. In other words, the query asks whether the sector currently being read is the one needed to provide the appropriate serial number digit needed. If so, control transfers to query operation 184. If not, control returns via operation 174.

Query 184 asks whether the over-sample burst prefix and gray code are valid. If they are valid, control transfers to query operation 186. If either the over-sample burst prefix or gray code are invalid, control returns via operation 174. This is done to ensure that the sensed gray code signals are real and the integrity of the information is acceptable.

Query 186 asks whether the parity check matches. This is an additional check used to ascertain whether there is a read error present in the gray code. If the parity check matches, the data read is probably good and control transfers to operation 188. If not, control returns via operation 174. Operation 188 stores the decoded ASCII character, which is part of the HDA serial number, in RAM. Control is then transferred to query operation 190 which asks whether the ASCII character is =0, i.e., whether the ASCII character is the termination character which signifies that the end of the serial number has been reached. If the answer to query operation 190 is yes, then control transfers to operation 192 where the retrieval request is turned off. Control then transfers to operation 174 where control returns to the Retrieve Serial Number from over-sample gray code routine 236. If the answer to query operation 190 is no, this means that there are more characters in the HDA serial number to be retrieved and decoded. Control transfers from operation 190 to operation 194 which increments the Target sector counter, indicating that another character is needed, and thus another over-sample sector needs to be read. Control then transfers to query operation 196 which asks whether the Target sector is larger than the number of sectors on the disc. If so, control transfers to operation 192 where the serial number retrieval request is turned off and then control returns in operation 174. If the answer to query operation 196 is no, this means that the next Target sector should have another serial number character encoded in it. Control then transfers to operation 198 where the value in the Target sector counter is stored. Control then returns via operation 174.

Figure 5:
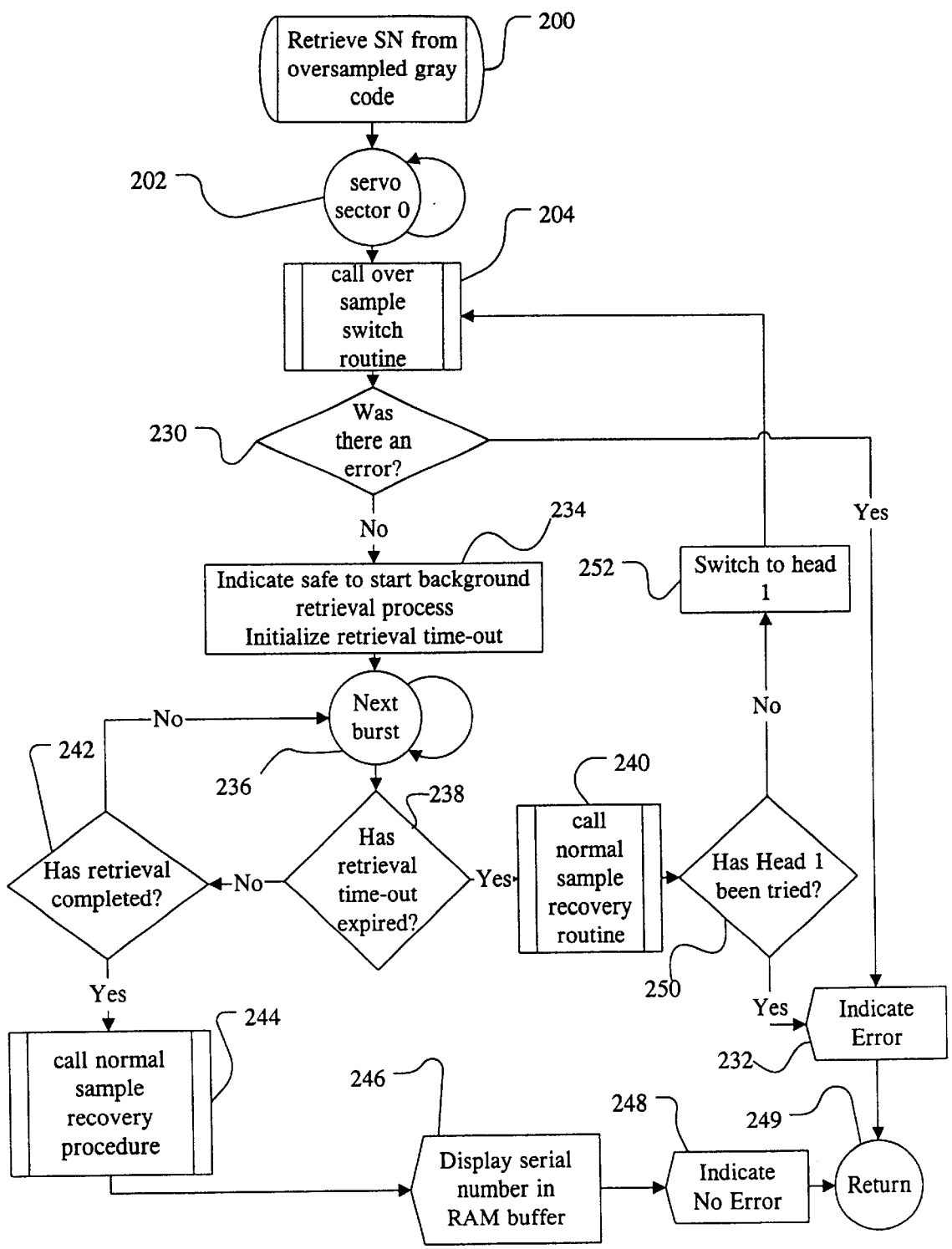
FIG. 5 is a flow chart of the Serial Number Retrieval Routine in accordance with a preferred embodiment of the present invention.

The Serial Number Retrieval routine is explained with reference to the flow chart shown in FIG. 5. The Read Serial Number routine begins in operation 200. This routine is the procedure which invokes the retrieval process to read the HDA serial number form the over-sampled gray code. In operation 202, the HDA serial number retrieval system is, in effect, in a holding state until the disc rotates to an index mark (servo sector 0). When servo sector 0 is detected, control transfers to operation 204 where the Over Sample Switch routine 206 shown in FIG. 6 is called.

Figure 6:
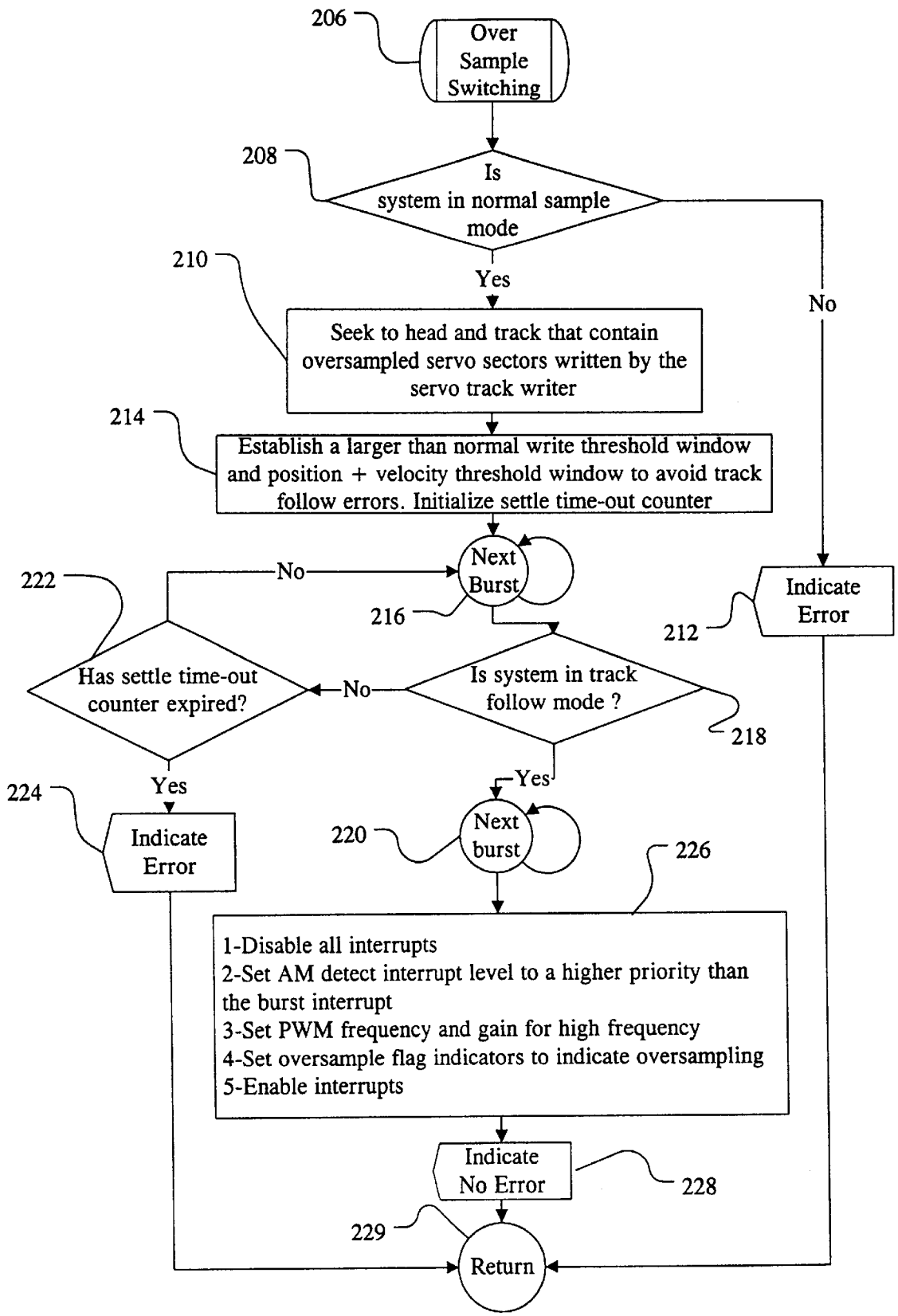
FIG. 6 is a flow chart of the Over Sample Switching subroutine in accordance with a preferred embodiment of the present invention.

Referring now to the Over Sample Switch routine in FIG. 6, control transfers through operation 206 to query operation 208 where the servo control system sample mode is determined. If the servo control system is in normal sample mode, control transfers to operation 210. If the servo system is not in normal sample mode, an error signal is generated in operation 212 and control returns via operation 229 to the call operation 204 in parent Serial Number retrieval routine 200. If the servo system is in normal sample mode in query operation 208 control transfers to operation 210 where the actuator seeks to a head and track that contains over-sample servo sectors written by the STW during initial drive manufacture and calibration. These are normally unused data tracks, typically the first and last 6 or 8 tracks on the disc. For example, and as shown in FIG. 2, the actuator may position the read/write heads over track 3. Next, control transfers to operation 214 in which a write threshold window is established which is larger than the normal write threshold window and a position and velocity threshold window larger than normal is set. These settings are preferred in order to avoid track follow errors since the gray code information is radially coherent, normal tracking accuracy is not needed. Finally, a settle time out counter is reset to a predetermined initial value.

Control then transfers to holding operation 216 to await sensing of a next servo burst. In terms of servo system timing, this operation 216 occurs approximately at t4. When a servo burst is sensed, control transfers to query operation 218 which asks whether the servo control system is in track follow mode. If it is, control transfers to holding operation 220 to await receipt of another servo burst. If the servo control system is not in track follow mode, control transfers to query operation 222 where a settle time-out counter is tested as to whether it has expired. If the settle time-out counter has expired without settling into track follow mode, an error is indicated in operation 224 and control returns via operation 229 to call operation 204. If the settle time-out-counter has not expired, control transfers back to holding operation 216 to await receipt of the next servo burst. Upon receipt of the next servo burst in operation 216, control again transfers to query operation 218 which tests whether the servo control system is in track follow mode again. If the system is now in track following mode, control transfers to hold operation 220 where the servo control awaits receipt of the next servo burst. When the next servo burst is received, control passes to operation 226. Operation 226 first disables all interrupts. Then the AM detect interrupt level is set to a higher priority than the burst interrupt, the PWM frequency and gain is set for high frequency, and the over-sample flag indicators are set to indicate that over-sampling has been requested. Finally, all interrupts are again enabled. Control then transfers to operation 228 where an indicator is set to indicate a no error condition. Control then returns via operation 229 to call operation 204.

Once the call operation 204 has been completed control transfers to query operation 230. Query 230 asks whether an error condition was detected during the over sample switch call 204. If there was an error, control transfers to operation 232 where an error indicator is set and control returns via operation 249 to the requesting diagnostic or certification routine that initiated the request for HDA serial number retrieval.

If no error condition is sensed in operation 230, control transfers to operation 234 in which a retrieval time-out counter is initialized. A flag is also set to indicate that it is safe to start retrieval of the serial number during background processing. Control then transfers to hold operation 236 to await receipt of the next servo burst. When the next servo burst is received or sensed, control transfers to operation 238 where the retrieval time-out counter is tested. If the retrieval time-out counter has expired or reached a predetermined value, control transfers to call operation 240. If the retrieval time-out counter has not expired, control transfers to query operation 242 where the query is made whether the HDA serial number retrieval has been completed. If it has not been completed, (i.e., a terminal digit of 0 has not been received), then control transfers back to the hold operation 236 to await receipt of the next servo burst. This looping between operations 236, 238, and 242 repeats until the serial number retrieval is completed and then control transfers to call operation 244 to return servo sampling operation to normal. Following the normal sample recovery procedure or routine, described below, control transfers to operation 246 where the HDA serial number is stored in a RAM buffer and then a no error flag is set in operation 248. Control then returns via operation 249 to the requesting diagnostic or certification routine that initiated the request for HDA serial number retrieval.

On the other hand, if the retrieval time-out has expired in query operation 238, control transfers to call operation 240, described in more detail below. Upon return from call operation 240, control transfers to query operation 250 which asks whether head number 1 has been tested for retrieval of the HDA serial number. If not, the servo control system switches the read channel to head number 1 and control transfers back to call operation 204. The retrieval sequence of operations described above is then repeated for head number 1 to hopefully successfully retrieve the serial number. After head number 1 has been tried per query operation 250, control transfers to operation 232 where an error indicator is set and then control returns via operation 249 to the requesting diagnostic or certification routine that initiated the request for HDA serial number retrieval.

Figure 7:
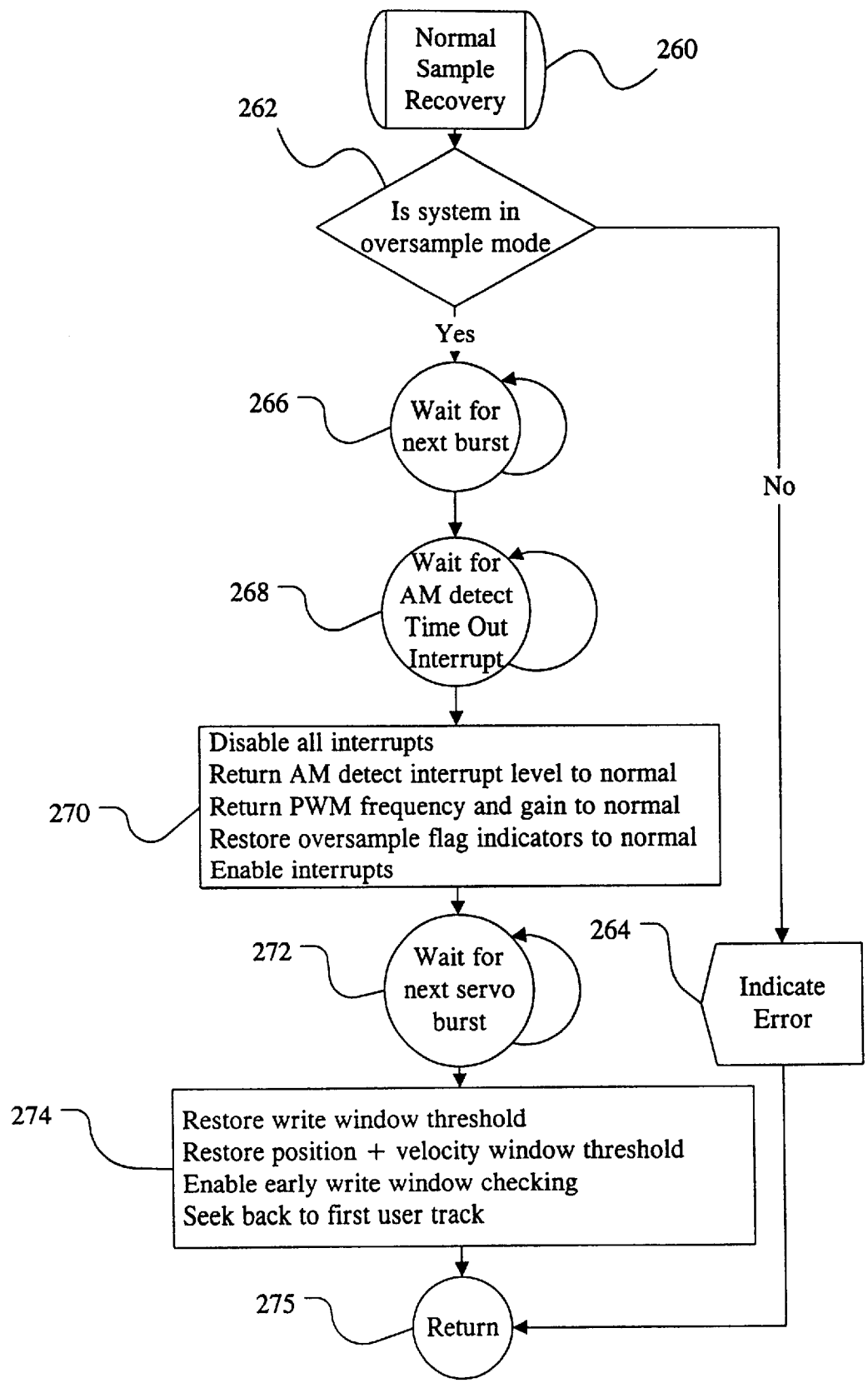
FIG. 7 is flow chart of the Normal Sample Recovery subroutine in accordance with a preferred embodiment of the present invention.

The Normal Sample recovery routine 260 is shown in block diagram form in FIG. 7. This routine is called from either operation 240 or 244 shown in FIG. 5. This procedure is used by the HDA serial number retrieval method to switch the servo control system back to normal servo sampling rate from the over sampling rate. Control in this subroutine begins in query operation 262 where the query is made whether the servo control system is in over-sample mode. If the system is in over-sample mode, control transfers to hold operation 266 where the next servo burst is awaited. If the answer is no, the system is not in over-sample mode, control transfers to operation 264 where an error flag is set and control then returns via operation 275 to the requesting operation 240 or 244.

When the next servo burst is sensed in operation 266, control then transfers to a hold operation 268 where the firmware waits for an Address Mark Detect Time-out Interrupt hardware interrupt. The Address Mark Detect Time-out interrupt is a hardware interrupt generated when the internal microprocessor timer overflows. It is used to output the over-sampled servo burst PES information then disable the AM detect and AM detect timeout interrupt. It occurs typically at time t8, shown in FIG. 2. Then it enables the burst interrupt and outputs normalized and linearized Position Error Signal (PES) from the over-sampled servo sector in phase with the normally generated PES output.

After the hardware AM Detect Time-out interrupt is sensed, control transfers to operation 270. Here, the previously changed gains and levels are reset to normal. Specifically, first, all interrupts are disabled. Then the AM detect interrupt level is returned to normal value, the PWM frequency and gain are returned to normal values, and the over-sample flag indicators are reset to normal states. Finally, all interrupts are re-enabled. Control then transfers to hold operation 272 where the next servo burst is awaited. Control then transfers to operation 274 where the write window threshold is restored, the position and velocity window thresholds are restored, early write window checking is re-enabled, and the servo control system is redirected back to the first user track. Control then returns via operation 275 to the requesting call 240 or 244 in FIG. 5.

Figure 8:
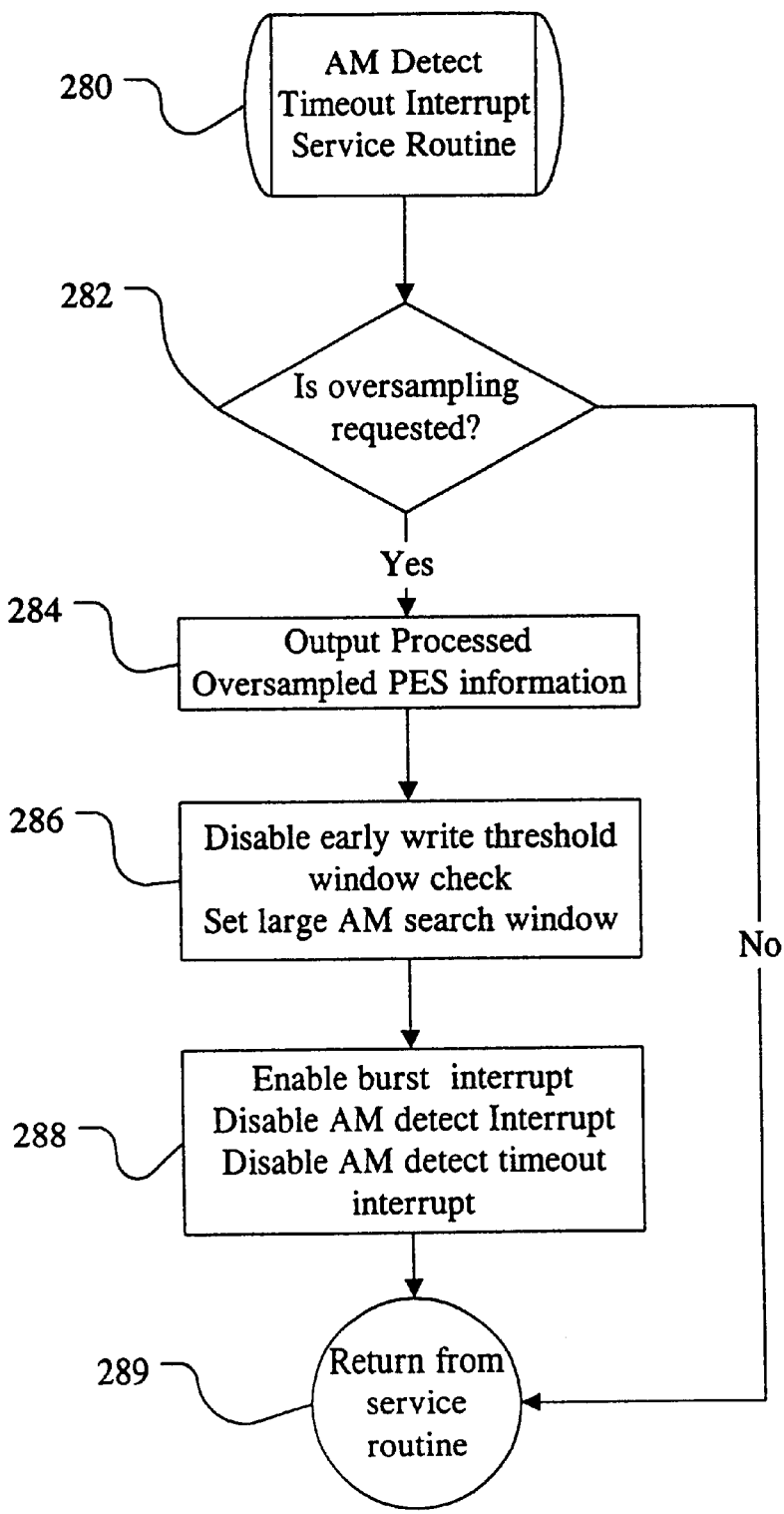
FIG. 8 is a flow chart of the Address Mark Time-out Interrupt firmware routine in accordance with a preferred embodiment of the invention.

Referring now specifically to FIG. 8, AM Detect Time-out Interrupt Service Routine 280 first queries, in operation 282, whether over-sampling has been requested by the certification program or a diagnostic test routine. If the answer is no, microprocessor control transfers via operation 289 back to operation 236 in FIG. 5. If the answer in operation 282 is yes, over-sampling is requested, control transfers to operation 284 where the over-sampled PES information is processed and output. Control then transfers to operation 286 where the early write threshold window check is disabled and a large Address Mark search window is set. Control then transfers to operation 288 where the burst interrupt is enabled, the AM Detect Interrupt is disabled, and the AM Detect Time-out Interrupt are disabled. Control then returns via operation 289 to operation 236 in FIG. 5.

In summary, the present invention is a method of storing information in a retrievable fashion on a magnetically permeable surface layer on a hard disc (such as 100) in a hard disc drive (such as 101) wherein the layer has concentric tracks (such as 105) designated between an inside diameter (such as 104) and an outside diameter (such as 106) of the disc. The disc (such as 100) has radially extending normal servo burst segments or sectors (such as 108) recorded thereon spaced around the disc surface on each track. The method basically includes encoding the information in a gray code and storing the information in at least one over-sample servo sector (such as 112) between the normal servo sectors (such as 108) on the disc.

The information that is encoded and then stored preferably is a head disc assembly (HDA) serial number made up of ASCII characters. The method preferably further includes converting each character of the HDA serial number to a run length limited gray code and writing the gray code for each of the characters in the HDA serial number sequentially in over-sample burst sectors (such as 112) positioned in between the normal servo burst sectors (such as 108) on the disc (such as 100). More preferably, each over-sample burst sector (such as 112) is in between two adjacent normal burst sectors (such as 108) and each over-sample burst sector is centered half way between two adjacent normal burst sectors for dual modulo encoding.

Preferably the method also may provide that multiple copies of the gray coded HDA serial number are written on each track on the disc (such as 100). In this case, converting the HDA serial number involves converting the 8 bit ASCII character to a 9 bit parity appended ASCII character and then converting the 9 bit parity appended ASCII character to a run length limited gray code. The run length limited gray code is then written to the over-sample servo sectors as part of the servo track writing process.

The method preferably further includes retrieving the encoded HDA serial number (such as operations 236, 238, 242, and 244) by reading the over-sample track at twice the normal servo sector rate to detect the gray code encoded serial number character and converting the retrieved gray code encoded serial number character to alphanumeric form (such as operations 182 through 188). Further, retrieving the encoded HDA serial number preferably includes testing the serial number character (such as operation 190) to determine whether the character is a termination character and storing the serial number character (such as operation 188) if the character is not a termination character. If the character is not a termination character, the reading, converting, testing, and storing operations (such as operations 184–188) are repeated for the next occurring over-sample servo sector burst (such as operations 236, 238, 242, 244, and 246). If the character is a termination character (such as in operation 190), these operations are not repeated and the retrieval is complete.

Stated another way, the invention is a method of storing and retrieving information (such as operations 200) on a magnetically permeable surface layer on a hard disc (such as 100) in a disc drive wherein the layer has concentric tracks designated between an inside diameter (such as 104) and an outside diameter (such as 106) of the disc and radially extending normal servo burst segments or sectors (such as 108) recorded thereon spaced around the disc surface on each track. The method involves storing the information in over-sample servo burst sectors (such as 112) spaced in between the normal servo burst sectors (such as 108) on the disc surface and retrieving the stored information (such as operations 236, 238, 242 and 244) by over-sampling the over-sample servo burst sectors. Storing the information more particularly involves storing a head disc assembly (HDA) serial number made up of ASCII characters. The method preferably includes the operations of converting each character of the HDA serial number to a run length limited gray code, writing the gray code for each of the characters in the HDA serial number sequentially in over-sample burst sectors (such as 112) positioned in between the normal servo burst sectors (such as 108) on the disc (such as 100). Retrieval involves reading the over-sample track at twice the normal servo sector rate (such as operations 236, 238, 242, and 244) to detect the gray code encoded serial number character stored in an over-sample sector and converting the gray code encoded serial number character to alphanumeric form. Preferably, retrieval also includes testing whether the character is a termination character (such as in operation 190), storing the serial number character if the character is not a termination character (such as in operations 188 and 190), and repeating the reading, converting, testing, and storing (such as in operations 236, 238, 242, and 244, and 246) for a next over-sample servo sector burst (such as 112) until the character converted is determined to be a termination character (such as in operation 190).

Preferably each over-sample burst sector (such as 112) is located in between two adjacent normal burst sectors (such as 108). Further, each over-sample burst sector is preferably centered half way between two adjacent normal burst sectors. Using the method according to the invention, multiple copies of the gray coded HDA serial number may be written on each track (such as 105) on the disc (such as 100). Where multiple copies of the serial number are written on an over-sample track, each copy of the gray coded HDA serial number written to the disc is followed by a termination character written to a next over-sample burst sector (such as 112).

Stated a different way, the invention involves a disc drive apparatus (such as 101) having a head disc assembly (HDA)

(such as 103) which has at least one disc (such as 100) in the assembly. The disc (such as 100) has a surface layer on at least one surface thereof for storing information on the disc. The disc has concentric tracks (such as 105) defined on the surface layer and normal servo burst sectors (such as 108) spaced around the disc forming spaced normal servo burst sectors on each track. The drive apparatus (such as 101) has means for retrieving information stored in over-sample servo sectors. These over-sample sectors are each spaced between two of the normal servo burst sectors (such as 108) on at least one of the tracks (such as 105). The information, in particular, preferably is the head disc assembly serial number encoded in gray code.

More particularly, a disc drive apparatus (such as 101) in accordance with a preferred embodiment of the invention has at least one hard disc (such as 100) in a head disc assembly (HDA) (such as 103) having a head disc assembly serial number made of ASCII characters. The hard disc (such as 100) has a magnetically permeable layer on at least one surface thereof for storing information thereon in magnetic form. The layer extends from an inside diameter (such as 104) to an outside diameter (such as 106) of the disc (such as 100), wherein the layer has concentric tracks (such as 105) thereon and normal servo sector wedges (such as 108) spaced around the disc forming normal servo sectors (such as 108) on each track (such as 105). The disc in the drive apparatus (such as 101) has over-sample servo sector bursts (such as 112) recorded on the layer, each over-sample burst being positioned between two adjacent normal servo sectors (such as 112). Each of the over-sample servo sector bursts has a portion of the information encoded therein. In particular, the encoded information in each over-sample sector is preferably a HDA serial number character encoded in a gray code on the over-sample servo sector and the encoded HDA serial number is retrievable by over-sampling the over-sample servo sectors (such as 112).

It will be clear that the present invention is well adapted to attain the ends and advantages mentioned as well as those inherent therein. For example, dual modulo storage and retrieval of information has been specifically described. However, several modulo operations may be implemented such as triple or quadruple modulo operations. As another example, the over-sample servo sectors may be used to store and provide additional position error signal (PES) information, particularly for use in the event that normal PES servo data is compromised. Thus, while a presently preferred embodiment has been described for purposes of this disclosure, numerous changes may be made which will readily suggest themselves to those skilled in the art. Accordingly, all such modifications, changes and alternatives are encompassed in the spirit of the invention disclosed and as defined in the appended claims.

What is claimed is:

1. A disc drive apparatus comprising:
   a head disc assembly (HDA) having a head disc assembly serial number;
   a disc in the HDA having a magnetically permeable layer on one surface thereof for storing information in magnetic form, wherein the layer has a plurality of concentric tracks defined on the layer and a plurality of normal servo sector wedges spaced around the disc forming spaced normal servo sectors on each track;
   a plurality of over-sample servo sector bursts recorded on the layer, each over-sample burst being positioned between two adjacent normal servo sectors, wherein each of the over-sample servo sector bursts has information encoded therein.

2. The drive apparatus according to claim 1 wherein the information is a head disc assembly serial number.

3. A method of storing information in a retrievable fashion on a magnetically permeable surface layer on a disc in a disc drive wherein the surface layer has a plurality of concentric tracks designated between an inside diameter and an outside diameter of the disc and has a plurality of radially extending normal servo burst sectors recorded thereon spaced around the surface layer on each track, the method comprising steps of:
   (a) encoding the information in a gray code; and
   (b) storing the information in one or more over-sample servo sectors positioned in between normal servo sectors on the disc.

4. The method according to claim 3 wherein the storing step (b) comprises positioning each over-sample burst sector in between two adjacent normal burst sectors.

5. The method according to claim 3 wherein the storing step (b) further comprises centering each over-sample burst sector half way between two adjacent normal burst sectors.

6. The method according to claim 3 wherein the encoding step (a) comprises encoding information which includes a head disc assembly (HDA) serial number made up of a plurality of characters.

7. The method according to claim 6 further comprising steps of:
   (c) converting each character of the HDA serial number to a run length limited gray code; and
   (d) writing the gray code for each of the characters in the HDA serial number sequentially in the over-sample burst sectors positioned in between the normal servo burst sectors on the disc.

8. The method according to claim 7 further comprising a step of:
   (e) writing multiple copies of the gray coded HDA serial number on each track of a plurality of tracks on the disc.

9. The method according to claim 7 wherein the converting step (c) further comprises:
   (c)(i) converting the character to a 9 bit parity appended character and
   (c)(ii) converting the 9 bit parity appended character to a run length limited gray code.

10. The method according to claim 7 further comprising a step (e) of retrieving the encoded HDA serial number by steps of:
    (e)(i) reading the over-sample track at twice the normal servo sector rate to detect the gray code encoded serial number character;
    (e)(ii) converting the gray code encoded serial number character to alphanumeric form;
    (e)(iii) testing whether the character is a termination character;
    (e)(iv) storing the serial number character if the character is not a termination character; and
    (e)(v) repeating the steps (e)(i) through (e)(iv) for a next over-sample servo sector burst if the character is not a termination character.

11. A method of storing and retrieving information on a magnetically permeable surface layer on a disc in a disc drive wherein the layer has a plurality of concentric tracks designated between an inside diameter and an outside diameter of the disc and a plurality of radially extending normal servo burst sectors recorded thereon spaced around the surface layer on the disc on each track, the method comprising steps of:

(a) storing the information in over-sample servo burst sectors spaced in between the normal servo burst sectors on the disc surface; and (b) retrieving the stored information by over-sampling the over-sample servo burst sectors.

12. The method according to claim 11 wherein the storing step (a) comprises storing information which includes a head disc assembly (HDA) serial number made up of a plurality of characters.

13. The method according to claim 12 further comprising steps of:

(c) converting each character of the HDA serial number to a run length limited gray code; and (d) writing the gray code for each of the characters in the HDA serial number sequentially in over-sample burst sectors each positioned in between the normal servo burst sectors on the disc;

(e) reading the over-sample track at twice the normal servo sector rate to detect the gray code encoded serial number character stored in an over-sample sector;

(f) converting the gray code encoded serial number character to an alphanumeric form;
testing whether the character is a termination character;

(g) storing the serial number character if the character is not a termination character; and (h) repeating steps (e) through (g) for a next over-sample servo sector burst until the character converted is determined to be a termination character.

14. The method according to claim 13 wherein the writing step (d) includes locating each over-sample burst sector in between two adjacent normal burst sectors.

15. The method according to claim 14 wherein the writing step (d) further includes writing a termination character to a next over-sample burst sector following each writing of a complete gray coded HDA serial number to over-sample burst sectors on a track.

16. The method according to claim 15 wherein the writing step (d) is repeated to write the gray coded HDA serial number to a plurality of tracks on the surface of the disc.

17. The method according to claim 16 wherein the characters are American Standard Code for Information Interchange (ASCII) characters and the converting step (c) further comprises:

(c)(i) converting each 8 bit ASCII character to a 9 bit parity appended ASCII character; and (c)(ii) converting the 9 bit parity appended ASCII character to a run length limited gray code.

18. The method according to claim 12 wherein the writing step (d) includes centering each over-sample burst sector half way between two adjacent normal burst sectors.

19. The method according to claim 11 wherein the storing step (a) includes writing multiple copies of the information on each of a plurality of tracks on the disc.

20. A disc drive apparatus comprising:

a head disc assembly having a disc in the assembly, the disc having a surface layer on a surface thereof storing information on the disc, the disc having a plurality of concentric tracks defined on the surface layer and a plurality of normal servo burst sectors spaced around the disc forming spaced normal servo burst sectors on each track; and means for retrieving information stored in over-sample servo sectors spaced between the normal servo burst sectors on one or more of the tracks.

* * * * *